Patented May 12, 1942

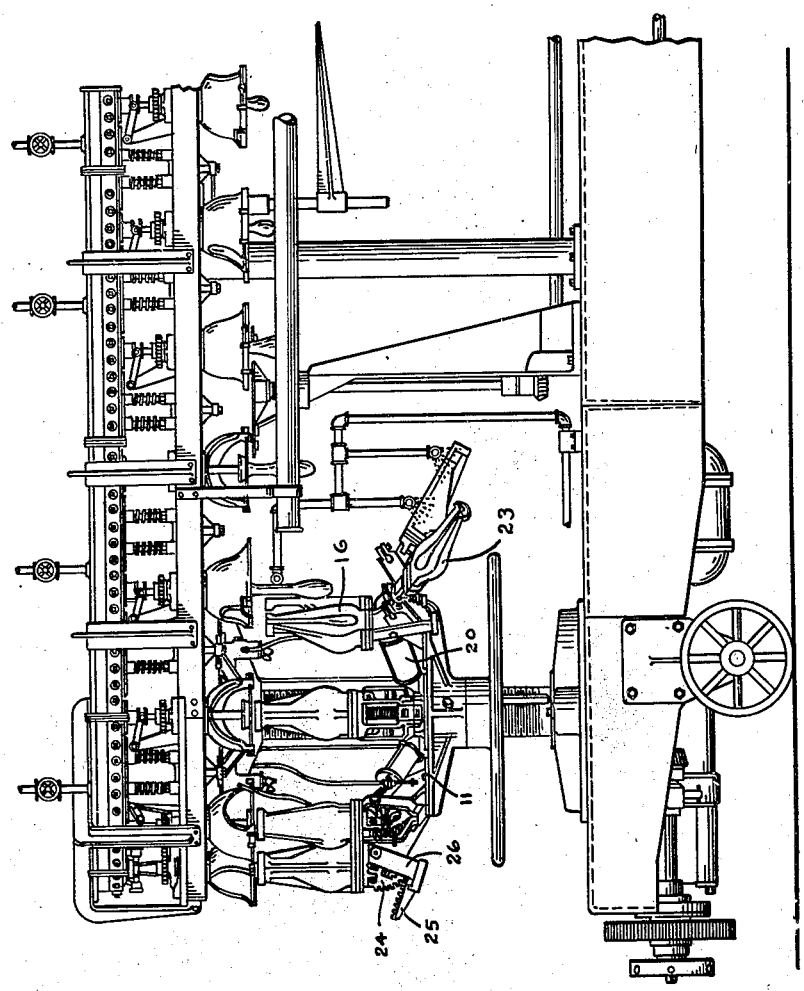

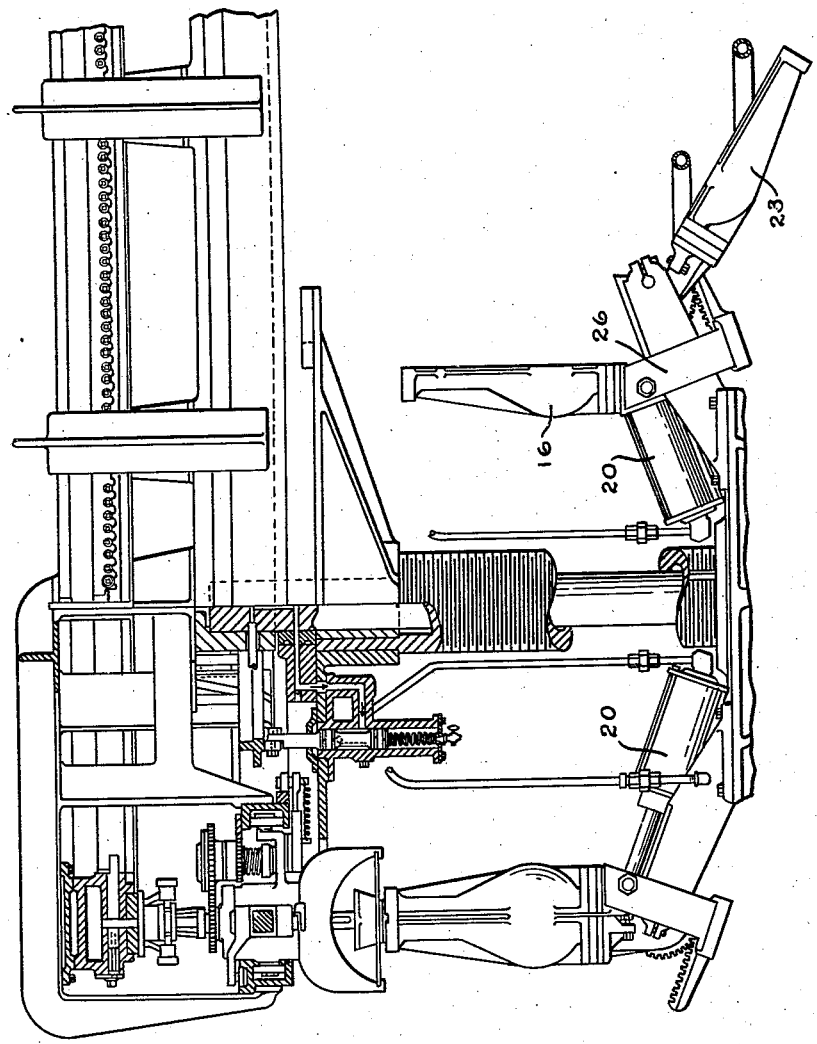

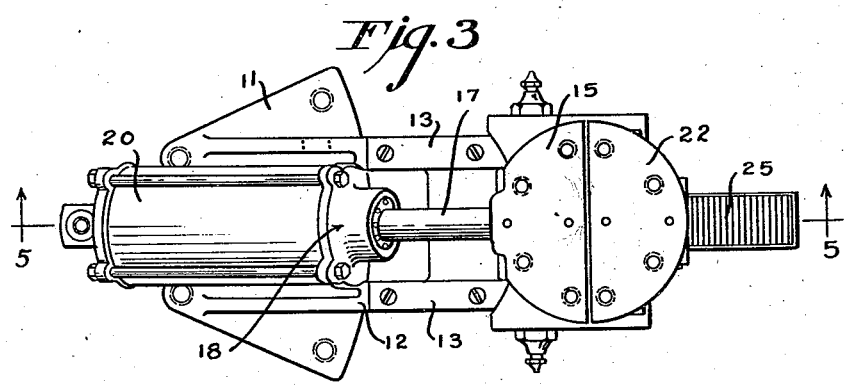
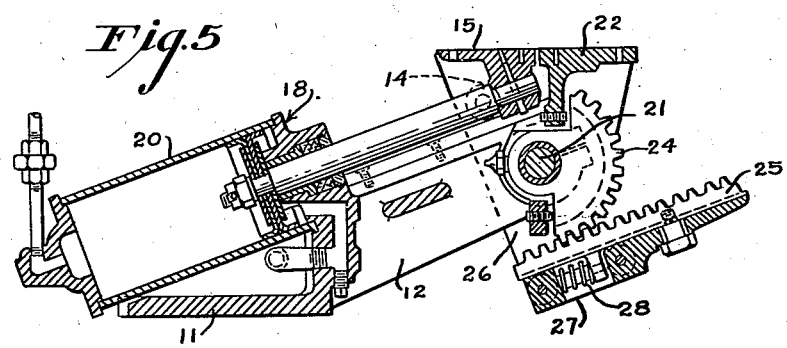
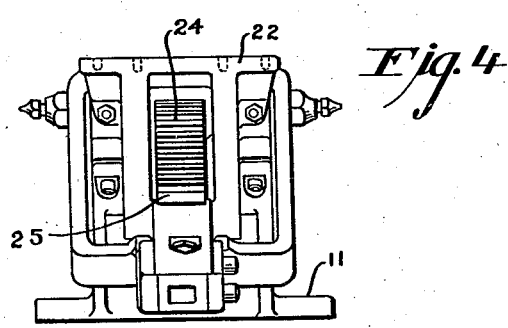

2,283,055

UNITED STATES PATENT OFFICE 2,283,055

GLASS WORKING APPARATUS

David E. Gray and Leander N. Pond, Corning, N. Y., and Walter C. Weber, West Hartford, Conn., assignors to Corning Glass Works, Corning, N. Y., a corporation of New York Original application August 12, 1938, Serial No. 224,628. Divided and this application December 11, 1939, Serial No. 308,708

3 Claims. (Cl. 49—42)

The present invention relates to glass working apparatus and particularly to a mold operating method and apparatus suitable for use in the production of bottles, light bulbs, tumblers, lamp chimneys and similar hollow glass articles, and constitutes a division of co-pending Gray et al. application Serial Number 224,628, filed August 12, 1938.

One object of the present invention is an improved form of mold operating mechanism.

Another object is an improved method of operating the complementary parts of a divided mold assembly.

In the drawings:

Fig. 1 is a side elevational view of a portion of a machine embodying the present invention;

Fig. 2 shows the upper left end portion of the apparatus of Fig. 1 on an enlarged scale and partly in section;

Fig. 3 is a plan view of a mold support embodying the invention and its pneumatic power operating unit;

Fig. 4 is an end elevation of Fig. 3; and

Fig. 5 is a sectional view taken on line 5—5 of Fig. 3.

The embodiment of the present invention as illustrated by Figs. 1 to 5, inclusive, in general, comprises a mold operating assembly adapted to close complementary mold parts about a parison of glass. It is sometimes desirable to make ware, such as containers for example, with slightly concave exterior bottom surfaces. When such form of ware is to be made, divided molds which open laterally cannot be used. With this fact in mind, the present mold operating assembly has been so designed that each mold proper comprises two halves, one of which remains in a vertical position, but has a sliding movement in a downward and lateral direction when being moved away from the finished ware, while the other half rotates about a fixed axis away from the ware. Specifically, each assembly comprises a support 11 having a pair of arms 12 provided with inclined fixed tracks 13 for rollers 14 carrying a platform 15 for the mold half 16 which has the sliding movement. The platform 15 is directly connected to the end of a drive rod 17 of a pneumatic power unit 18 which is arranged parallel to tracks 13 and it will therefore be evident that the platform is rolled up and down its tracks as air is supplied alternately to the lower and upper ends of an associated power cylinder 20 of this unit. The arms 12 at their free ends are drilled to receive a transverse pin 21 which carries a platform 22 for the mold half 23 having a rotary movement. A sector gear 24 for transmitting rotary motion to platform 22 is also carried by pin 21 and arranged in fixed relation to the sector gear. Rotary movement of platform 22 and its mold half 23 in synchronism with the movement of platform 15 is effected by a rack 25 in mesh with gear 24. This rack is carried by an arm 26, connected in fixed relation to platform or mold support 15, through an intervening support 27 and a cushioning spring 28. With this form of construction it will be evident that as the rack moves back and forth the mold halves will be moved into and out of operative relation with one another, and that since the one mold half is arranged to rotate about a horizontal axis below the molded article and the other mold half is arranged to move downwardly and laterally, the article can be made to have a concave bottom surface without interfering with the opening movement of the respective mold halves.

What is claimed is:

1. In a glass working apparatus a mold opening and closing mechanism including an inclined track, a drive rod arranged for movement in a path parallel to said track, a mold part support rigidly fixed to said rod and resting on said track, a pin arranged in fixed relation to said track, a sector gear pivoted thereon, a second mold part support fixed to said sector gear, and a rack arranged in fixed relation to said drive rod and having its teeth in mesh with teeth of said sector gear.

2. In a glass working apparatus, supports for the respective halves of a divided mold assembly arranged in the same horizontal plane when in position to hold mold haves supported thereby in cooperative relation, an inclined track having one of said supports associated with it located at its high end when they are in a position to hold the mold halves closed, means for moving the support associated with said track back and forth thereover, a pin carrying a gear for swinging the other of said supports into and out of cooperative relation with the support associated with said track, and a rack associated with said means arranged in mesh with said gear.

3. In a glass working apparatus, means for supporting a plurality of mold sections in cooperative relation to one another to form a mold cavity, means for moving one of said sections in a straight line downwardly and laterally away from the axial center of such mold cavity in the mold opening operation, and interconnecting means actuated by the movement of said mold section for moving another of said mold sections about a pivot located below and in alignment with the axial center of said mold cavity.

DAVID E. GRAY.
LEANDER N. POND.
WALTER C. WEBER.